United States Patent
Bhaskaran

(10) Patent No.: US 12,489,569 B2
(45) Date of Patent: Dec. 2, 2025

(54) CARRIER CONFIGURATION AND MONITORING OF COMMUNICATION DEVICES IN A SHARED COMMUNICATION ENVIRONMENT

(71) Applicant: Rakuten Symphony, Inc., Tokyo (JP)

(72) Inventor: Sridhar Bhaskaran, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/799,170

(22) PCT Filed: Aug. 4, 2022

(86) PCT No.: PCT/US2022/039450
§ 371 (c)(1),
(2) Date: Aug. 11, 2022

(87) PCT Pub. No.: WO2024/030130
PCT Pub. Date: Feb. 8, 2024

(65) Prior Publication Data
US 2024/0195543 A1 Jun. 13, 2024

(51) Int. Cl.
*H04L 5/00* (2006.01)

(52) U.S. Cl.
CPC ............ *H04L 5/001* (2013.01); *H04L 5/0048* (2013.01)

(58) Field of Classification Search
CPC ........ H04L 5/001; H04L 5/0048; H04W 4/02; H04W 4/08
See application file for complete search history.

(56) References Cited

U.S. PATENT DOCUMENTS

| | | | |
|---|---|---|---|
| 2007/0232353 A1* | 10/2007 | Miyazaki | H04W 88/085 455/518 |
| 2018/0063847 A1 | 3/2018 | Huang et al. | |
| 2018/0242349 A1* | 8/2018 | Noh | H04W 72/56 |
| 2020/0205081 A1 | 6/2020 | Garg et al. | |
| 2021/0195675 A1 | 6/2021 | Park et al. | |
| 2021/0250735 A1 | 8/2021 | Hao et al. | |
| 2021/0297925 A1 | 9/2021 | Berzin et al. | |
| 2021/0321407 A1* | 10/2021 | Matsuo | H04L 41/0897 |
| 2021/0399854 A1* | 12/2021 | Outes Carnero | H04W 24/02 |
| 2022/0232423 A1 | 7/2022 | Thyagaturu et al. | |
| 2022/0272594 A1* | 8/2022 | Anderson | H04W 24/02 |

(Continued)

OTHER PUBLICATIONS

International Search Report and Written Opinion for Intl. Pat. App. No. PCT/US22/39450 mailed Oct. 26, 2022.

(Continued)

*Primary Examiner* — Steven Hieu D Nguyen
(74) *Attorney, Agent, or Firm* — Sughrue Mion, PLLC

(57) ABSTRACT

Methods, systems, and computer program products are provided for carrier configuration and monitoring of communication devices in a shared communication environment. In some implementations, a carrier configuration may be performed in a radio access network compliant radio unit (RU), where one or more distributed units (DU) may be associated with different carriers and/or different network operators. Further, monitoring of each such DU and/or any its management connections may be executed, whereby the remote radio unit may be configured to determine individual carrier states when there is a specific DU failure.

13 Claims, 15 Drawing Sheets

(56) References Cited

U.S. PATENT DOCUMENTS

| | | | | |
|---|---|---|---|---|
| 2022/0286910 A1* | 9/2022 | Ramakrishnan | ...... | H04W 48/08 |
| 2023/0217505 A1* | 7/2023 | Alasti | ...... | H04W 16/10 |
| | | | | 370/329 |
| 2023/0283524 A1* | 9/2023 | Jung | ...... | H04W 24/04 |
| | | | | 370/254 |
| 2024/0224122 A1* | 7/2024 | Madan | ...... | H04W 4/50 |

OTHER PUBLICATIONS

O-RAN Alliance, "O-RAN Alliance Working Group 4 Management Plane Specification," <Downloaded from the Internet: https://pdfcoffee.com/download/oran-wg4mp0-v0100-pdf-free.html> <Downloaded on: Oct. 6, 2022> <Date of publication: Mar. 11, 2019>, pp. 13, 82.

O-RAN Management Plane Specification 7.01, O-RAN.WG4.MP.0-v07.01, "O-RAN Alliance Working Group 4 Management Plane Specification," Apr. 2022.

"Suggestions on Potential Solutions to C-RAN by NGMN Alliance", Jan. 3, 2013, Version 4.0, pp. 1-41 (41 pages total).

"O-RAN Working Group 1 Use Cases Detailed Specification", O-RAN.WG1. Use-Cases-Detailed-Specification-v08.00, Technical Specification, Jul. 1, 2022, 89 pages.

\* cited by examiner

CARRIER CONFIGURATION AND MONITORING OF COMMUNICATION DEVICES IN A SHARED COMMUNICATION ENVIRONMENT

CROSS-REFERENCE TO RELATED APPLICATIONS

The present application claims priority to and is the 35 U.S.C. 371 United States National Phase application based on International Patent Application No. PCT/US22/39450, filed on Aug. 4, 2022, entitled "CARRIER CONFIGURATION AND MONITORING OF COMMUNICATION DEVICES IN A SHARED COMMUNICATION ENVIRONMENT," which is hereby incorporated by reference in its entirety.

TECHNICAL FIELD

In some implementations, the current subject matter relates to telecommunications systems, and in particular, to carrier configuration and monitoring of communication devices, e.g., distributed units, in a shared communication environment, such where one or more distributed units may be communicatively coupled to one or more remote radio units.

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if the mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile: in rural areas, the range can be as much as 5 miles: and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G standard is currently being developed and deployed. 3GPP cellular technologies like LTE and 5G NR are evolutions of earlier generation 3GPP technologies like the GSM/EDGE and UMTS/HSPA digital cellular technologies and allows for increasing capacity and speed by using a different radio interface together with core network improvements.

Cellular networks can be divided into radio access networks and core networks. The radio access network (RAN) can include network functions that can handle radio layer communications processing. The core network can include network functions that can handle higher layer communications, e.g., internet protocol (IP), transport layer and applications layer. In some cases, the RAN functions can be split into baseband unit functions and the radio unit functions, where a radio unit connected to a baseband unit via a fronthaul network, for example, can be responsible for lower layer processing of a radio physical layer while a baseband unit can be responsible for the higher layer radio protocols, e.g., MAC, RLC, etc.

To ensure uninterrupted communications in wireless communication systems, various devices may need to be properly configured and/or monitored for failure of communication sessions. However, currently implemented protocols are not capable of providing effective management of configurations of such devices, including any shared device arrangements, as well as monitoring and responding to communication session failures.

SUMMARY

In some implementations, the current subject matter relates to a computer-implemented method. The method may include grouping a plurality of first communication devices into a plurality of groups and associating each group in the plurality of groups with a second communication device in a wireless communication system, configuring the second communication device for communication with one or more groups of first communication devices, and transmitting, using the configured second communication device, one or more communications in the wireless communication system.

In some implementations, the current subject matter can include one or more of the following optional features. In some implementations, each first communication device in the plurality of first communication devices may be a distributed unit. Further, the second communication device may be a radio unit.

In some implementations, one or more first communication devices in the plurality of first communication devices may be a host first communication device and another one or more first communication devices in the plurality of first communication devices may be a shared resource operator first communication device. Further, each host first communication device in the one or more first communication devices may be grouped into one or more host groups in the plurality of groups, and each shared resource operator first communication device in the another one or more first communication devices may be grouped into one or more shared resource operator groups in the plurality of groups. Further, the method can also include detecting failure of the host first communication device, the method can also include terminating communication with the failed host first communication device, and the communication may be associated with a predetermined carrier controlled by the failed host first communication device. Further, the configuring of the second communication device may include reconfiguring, based on the detection of the failure of the host first communication device, for communication with another one or more groups of first communication devices. Further, the reconfiguring may be executed using service management and orchestration function of the wireless communication system: the reconfiguring may be executed in a management plane: and/or the method can also include transmitting a call home command to the another one or more groups of first communication devices and receiving, in response to the call home command, one or more carrier configurations from the another one or more groups of first communication devices, the one or more carrier configurations being configured by the another one or more groups of first communication devices. Further, the one or more carrier configurations may include at least one of: one or more transmitting array carrier configurations and one or more receiving array carrier configurations, and/or the transmitting the one or more communications in the wireless communication system may include transmitting the one or more communications using the one or more carrier configurations.

In some implementations, at least one of the grouping, the configuring, and the transmitting may be performed by at least one base station in a wireless communication system. Further, the base station may include at least one of the following: a base station, an eNodeB base station, a gNodeB base station, a wireless base station, and any combination thereof. Further, the base station may be a base station operating in at least one of the following communications systems: a long term evolution communications system, a new radio communications system, a wireless communication system, and any combination thereof.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a:

FIG. 1c illustrates additional detail of the evolved packet core of the exemplary LTE system shown in FIG. 1a:

FIG. 1d illustrates an exemplary evolved Node B of the exemplary LTE system shown in FIG. 1a;

DETAILED DESCRIPTION

Figure 1A:
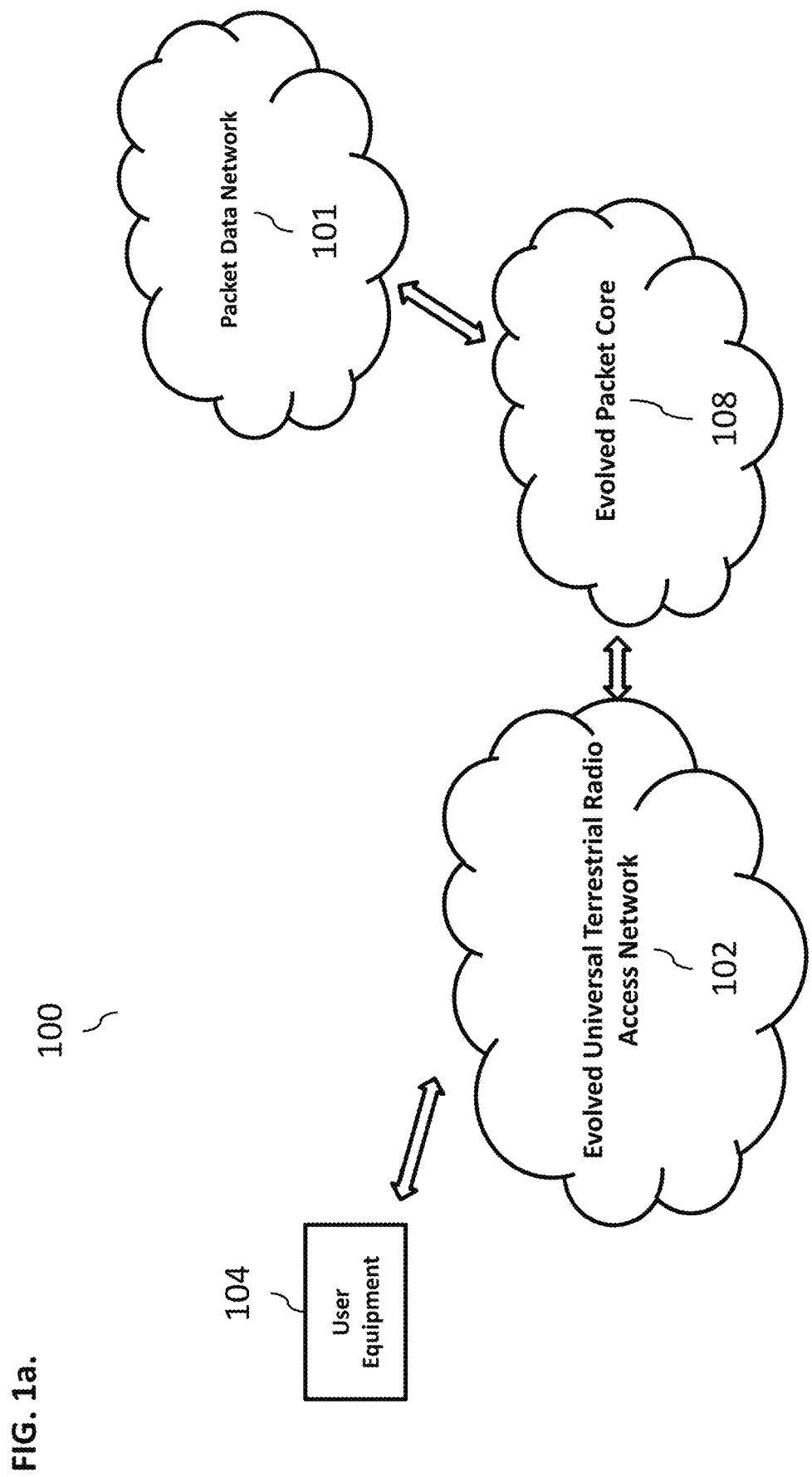
FIG. 1a illustrates an exemplary conventional long term evolution ("LTE") communications system.

The current subject matter can provide for systems and methods that can be implemented in wireless communications systems. Such systems can include various wireless communications systems, including 5G New Radio communications systems, long term evolution communication systems, etc.

In some implementations, the current subject matter relates to performing a carrier configuration in a radio access network compliant radio unit (RU), where one or more distributed units (DU) may be associated with different carriers and/or different network operators. Further, the current subject matter may be configured to execute monitoring of each such DU and/or any its management connections, whereby the remote radio unit may be configured to determine individual carrier states when there is a specific DU failure.

To execute the above configuration and/or monitoring processes, the current subject matter may be configured to group a plurality of first communication devices (e.g., distributed units) into a plurality of groups. Each group of such distributed units may be associated with a second communication device (e.g., a remote radio unit). The distributed unit(s) may be communicatively coupled in a wireless communication system, e.g., long term evolution communication system, a new radio communication system, and/or any other communication system. The remote radio unit may also be configured for communication with one or more groups of distributed units. Using the configured distributed unit(s), one or more communications may be transmitted in such wireless communication system.

In some implementations, one or more distributed units may serve as a host distributed unit and another distributed unit may be a shared resource operator distributed unit. Each host distributed unit in the one or more distributed units may be grouped into one or more host groups. Each shared resource operator distributed unit may be grouped into one or more shared resource operator groups.

In some implementations, the current subject matter may be further configured to detect a failure of the host distributed unit, and as a result, terminate communication with the failed host distributed unit. The communication may be associated with a predetermined carrier controlled by the failed host distributed unit. Further, configuration of the radio unit may include reconfiguring of the radio unit, based on the detection of the failure of the host distributed unit, for communication with another one or more groups of distributed units. Reconfiguration may be executed using service management and orchestration function of the wireless communication system. Alternatively, or in addition to, reconfiguration may be executed in a management plane.

In some implementations, the current subject matter may be configured to transmit a call home command to the other one or more groups of distributed units and receive, in response to the call home command, one or more carrier configurations from the other one or more groups of distributed units. The carrier configurations may be configured by the other one or more groups of distributed units. For example, carrier configurations may include at least one of: one or more transmitting array carrier configurations and/or one or more receiving array carrier configurations. In some implementations, transmission of one or more communications in the wireless communication system may include transmission(s) of one or more communications using such carrier configurations.

In some implementations, one or more of the above processes may be performed by at least one base station in a wireless communication system. The base station may include at least one of the following: a base station, an eNodeB base station, a gNodeB base station, a wireless base station, and any combination thereof. Further, the base station may be a base station operating in at least one of the following communications systems: a long term evolution communications system, a new radio communications system, a wireless communication system, and any combination thereof.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is an evolution of the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1B:
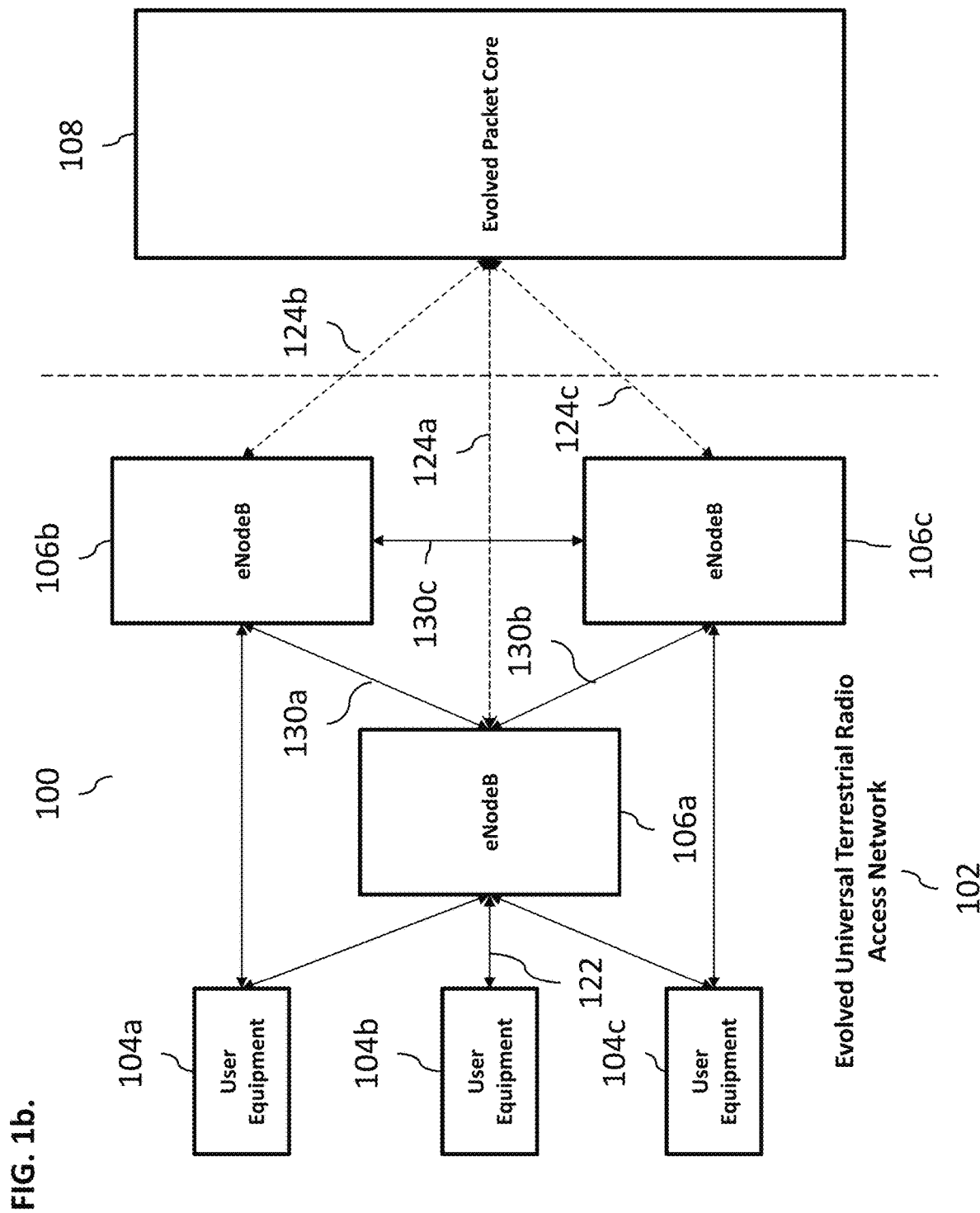

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
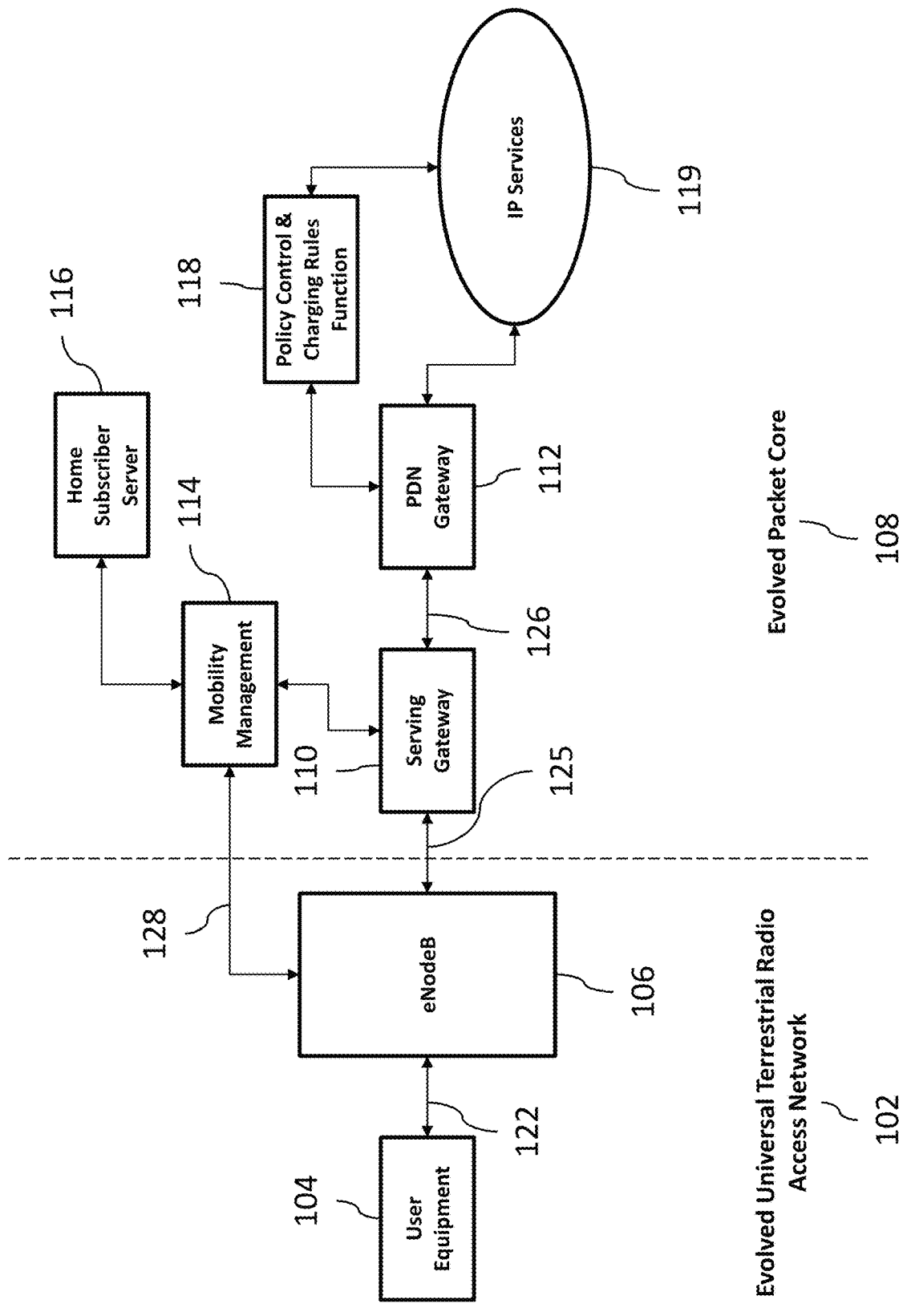

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(*a*, *b*, *c*). As shown in FIG. 1*a*, X2 interface 130*a* provides interconnection between eNodeB 106*a* and eNodeB 106*b*; X2 interface 130*b* provides interconnection between eNodeB 106*a* and eNodeB 106*c*: and X2 interface 130*c* provides interconnection between eNodeB 106*b* and eNodeB 106*c*. The X2 interface can be established between two eNodeBs in order to provide an exchange of signals, which can include a load- or interference-related information as well as handover-related information. The eNodeBs 106 communicate with the evolved packet core 108 via an S1 interface 124(*a*, *b*, *c*). The S1 interface 124 can be split into two interfaces: one for the control plane (shown as control plane interface (S1-MME interface) 128 in FIG. 1*c*) and the other for the user plane (shown as user plane interface (S1-U interface) 125 in FIG. 1*c*).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to inter-work with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1*c*. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1*a*). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream Qos, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QOS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1*a*).

Figure 1D:
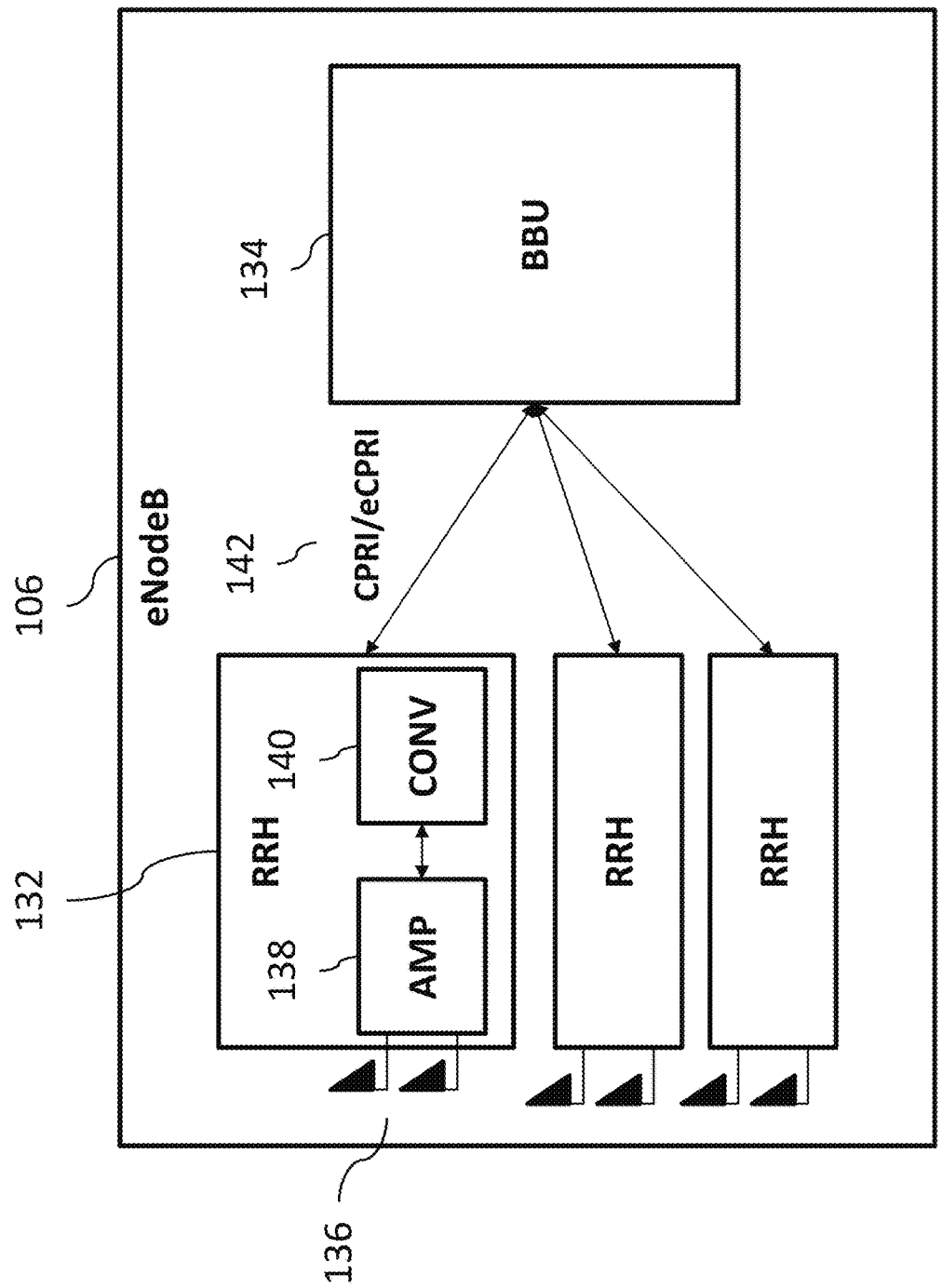

FIG. 1*d* illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI")/enhanced CPRI ("eCPRI") 142 standard specification either using RRH specific custom control and user plane framing methods or using O-RAN Alliance compliant Control and User plane framing methods. The operation of the eNodeB 106 can be characterized using the following standard parameters (and specifications): radio frequency band (Band4, Band9, Band17, etc.), bandwidth (5, 10, 15, 20 MHz), access scheme (downlink: OFDMA: uplink: SC-OFDMA), antenna technology (Single user and multi user MIMO; Uplink: Single user and multi user MIMO), number of sectors (6 maximum), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1*d*). Conversely, the RF signals that are received from user equipment 104 are amplified (using AMP 138) and converted (using CONV 140) to digital baseband signals for transmission to the BBU 134.

Figure 2:
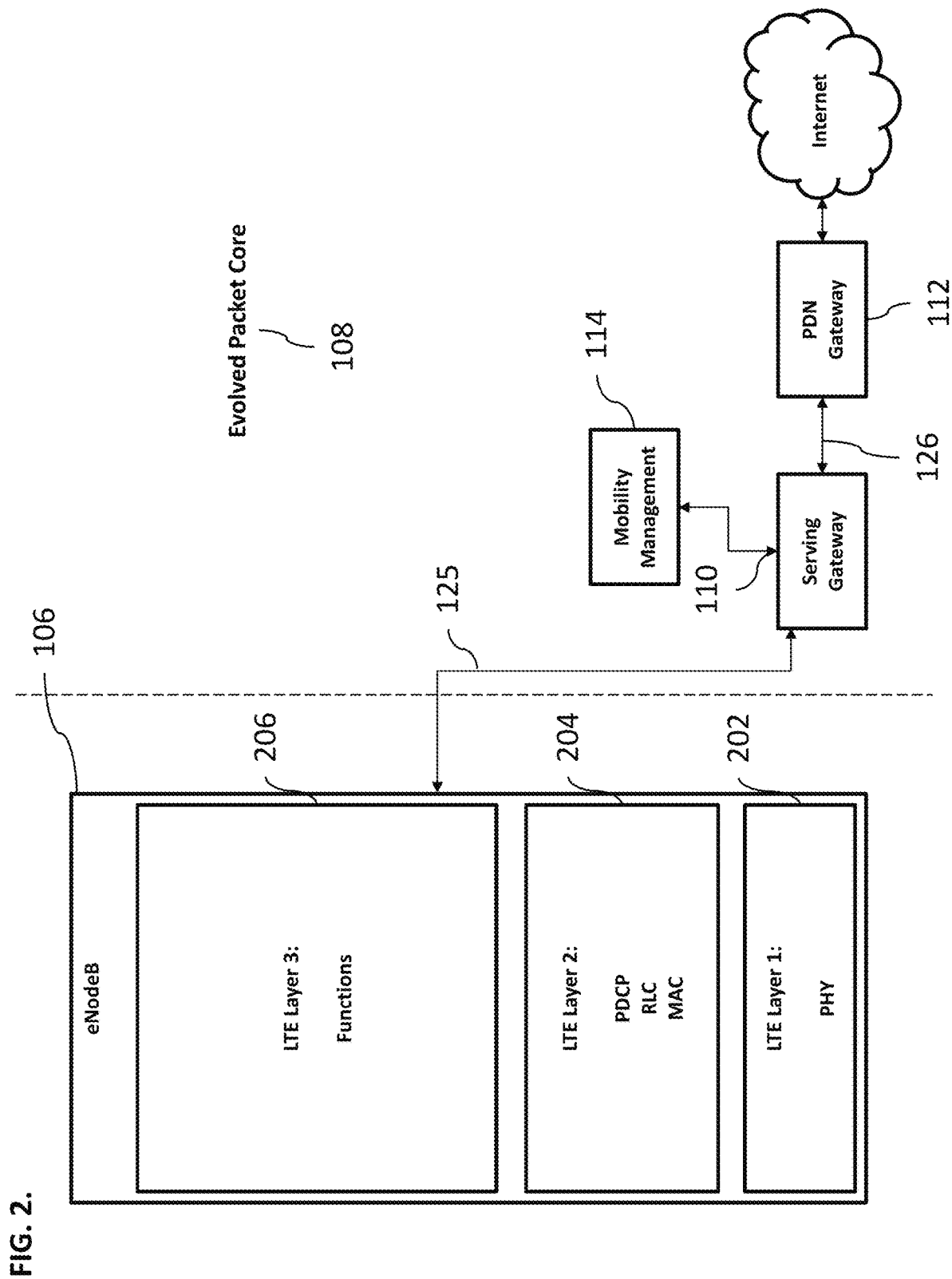
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1d, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when it is not possible to do so with Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
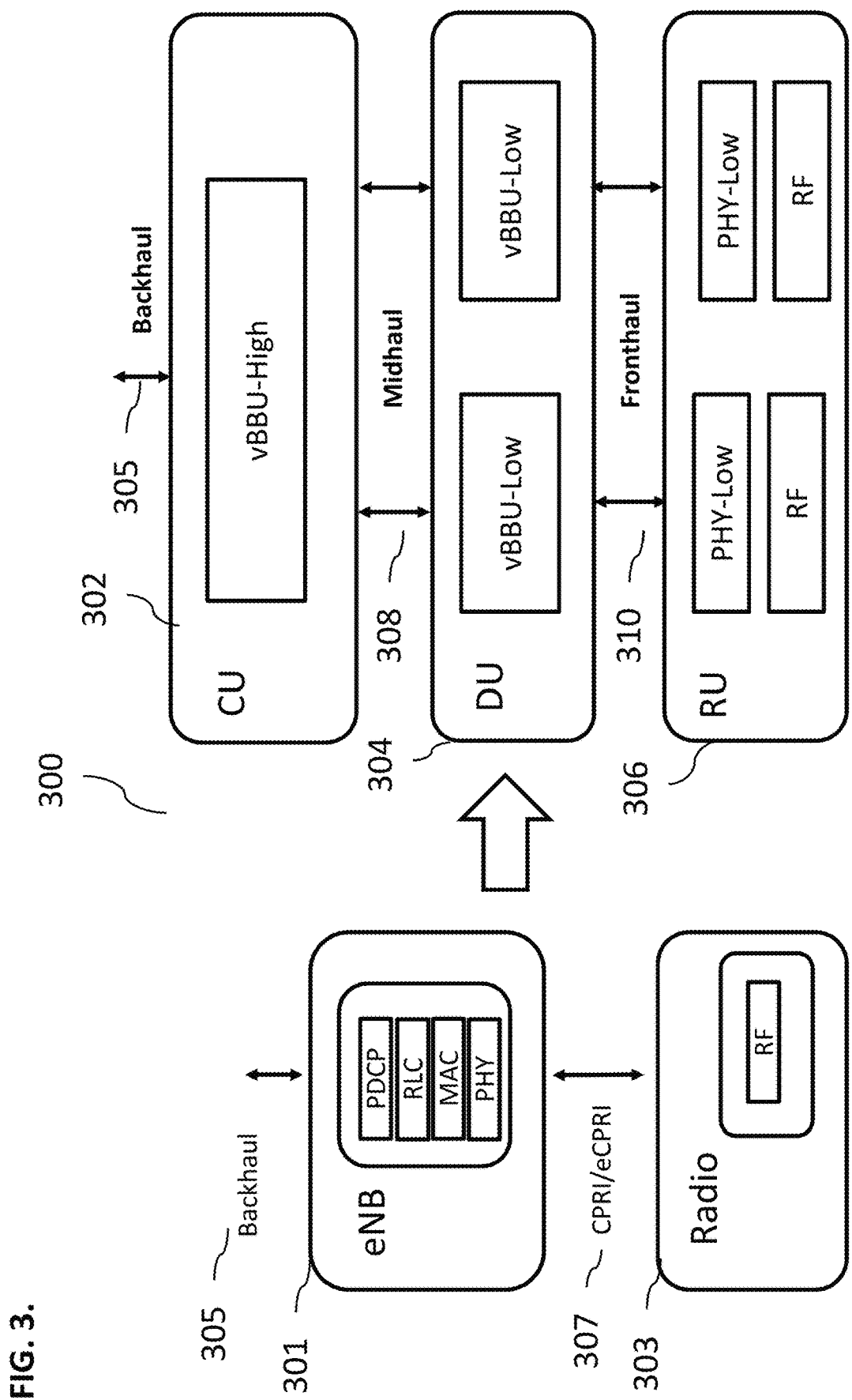
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 307, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 308. The units 302, 304 can include one or more base stations, macro base stations, micro base stations, remote radio heads, etc. and/or any combination thereof.

In lower layer split architecture environment, a CPRI bandwidth requirement for NR can be 100s of Gb/s. CPRI compression can be implemented in the DU and RU (as shown in FIG. 3). In 5G communications systems, compressed CPRI over Ethernet frame is referred to as eCPRI and is the recommended fronthaul network. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer-split architecture, frequency-domain samples can be transported via Ethernet fronthaul, where the frequency-domain samples can be compressed for reduced fronthaul bandwidth.

Figure 4:
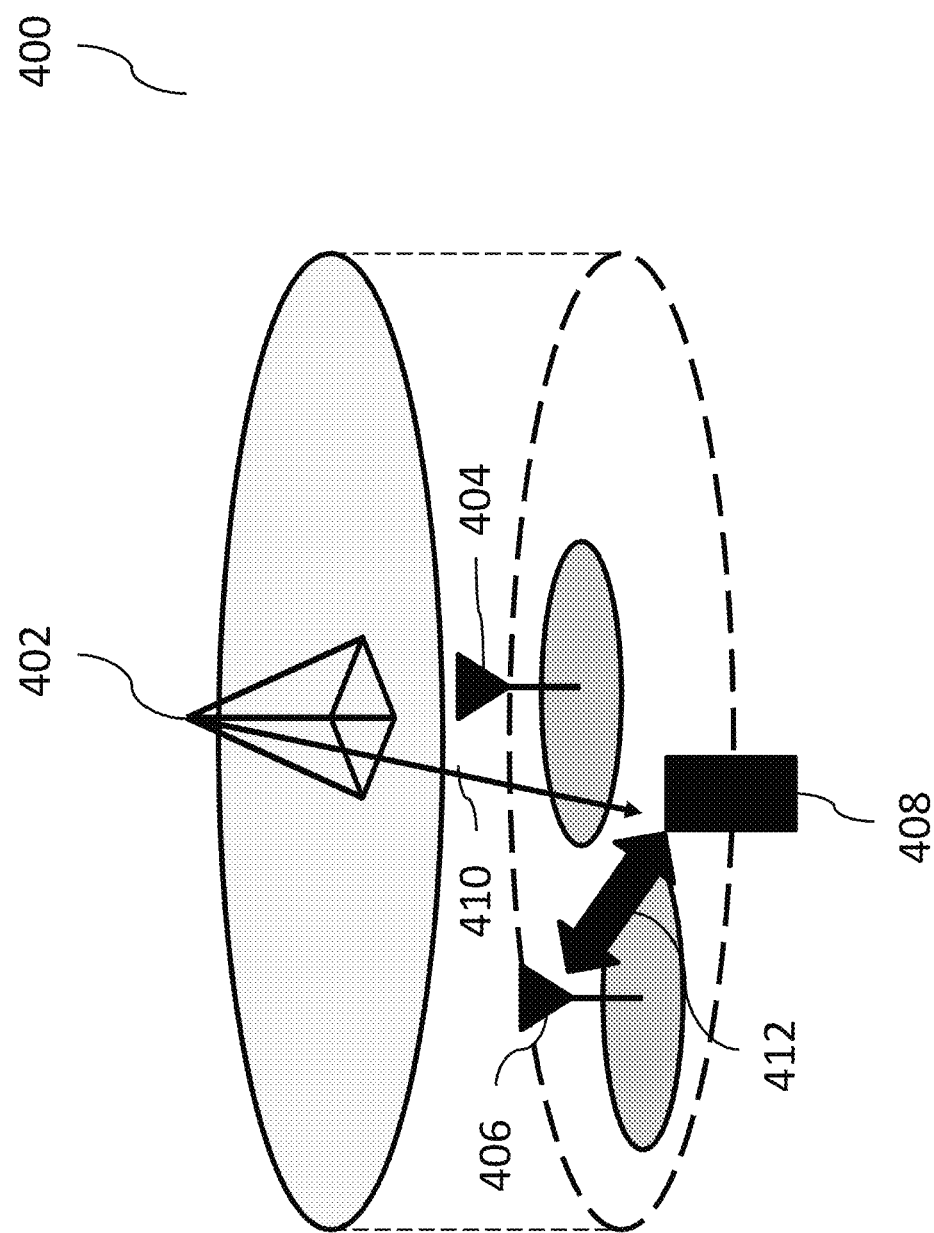
FIG. 4 illustrates an exemplary 3GPP split architecture to provide its users with use of higher frequency bands.

FIG. 4 illustrates an exemplary communications system 400 that can implement a 5G technology and can provide its users with use of higher frequency bands (e.g., greater than 10 GHz). The system 400 can include a macro cell 402 and small cells 404 and 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 402, 404 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE and NR can be transmitted on the same frequency.

Figure 5A:
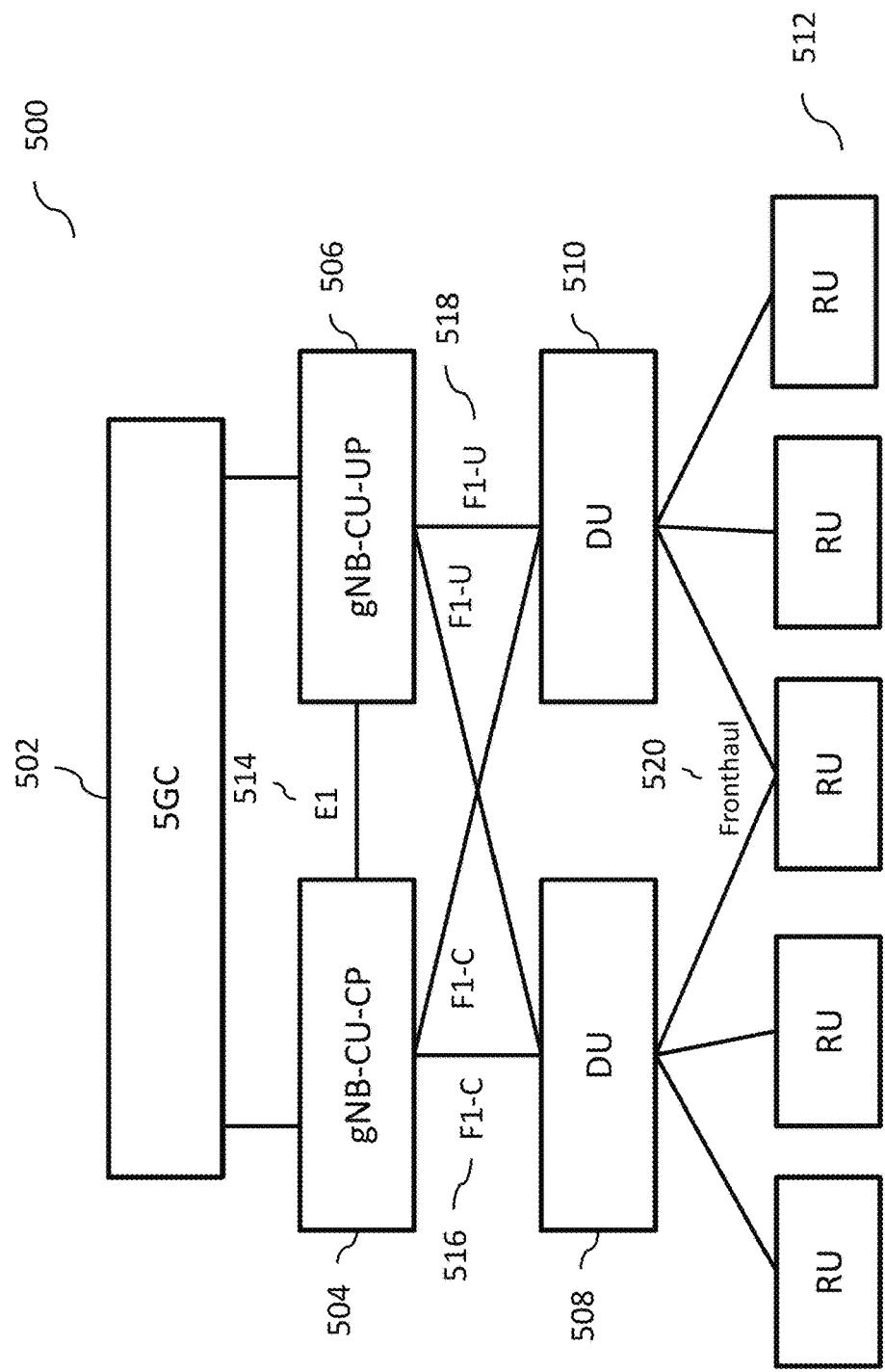
FIG. 5a illustrates an exemplary 5G wireless communication system.

FIG. 5a illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the higher layer split architecture. The distributed units 508, 510 can be configured to execute RLC, MAC and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul network 520 (which may include one or switches, links, etc.), which in turn communicate with one or more user equipment (not shown in FIG. 5*a*). The remote radio units 512 can be configured to execute a lower part of the PHY layer protocols as well as provide antenna capabilities to the remote units for communication with user equipments (similar to the discussion above in connection with FIGS. 1*a*-2).

Figure 5B:
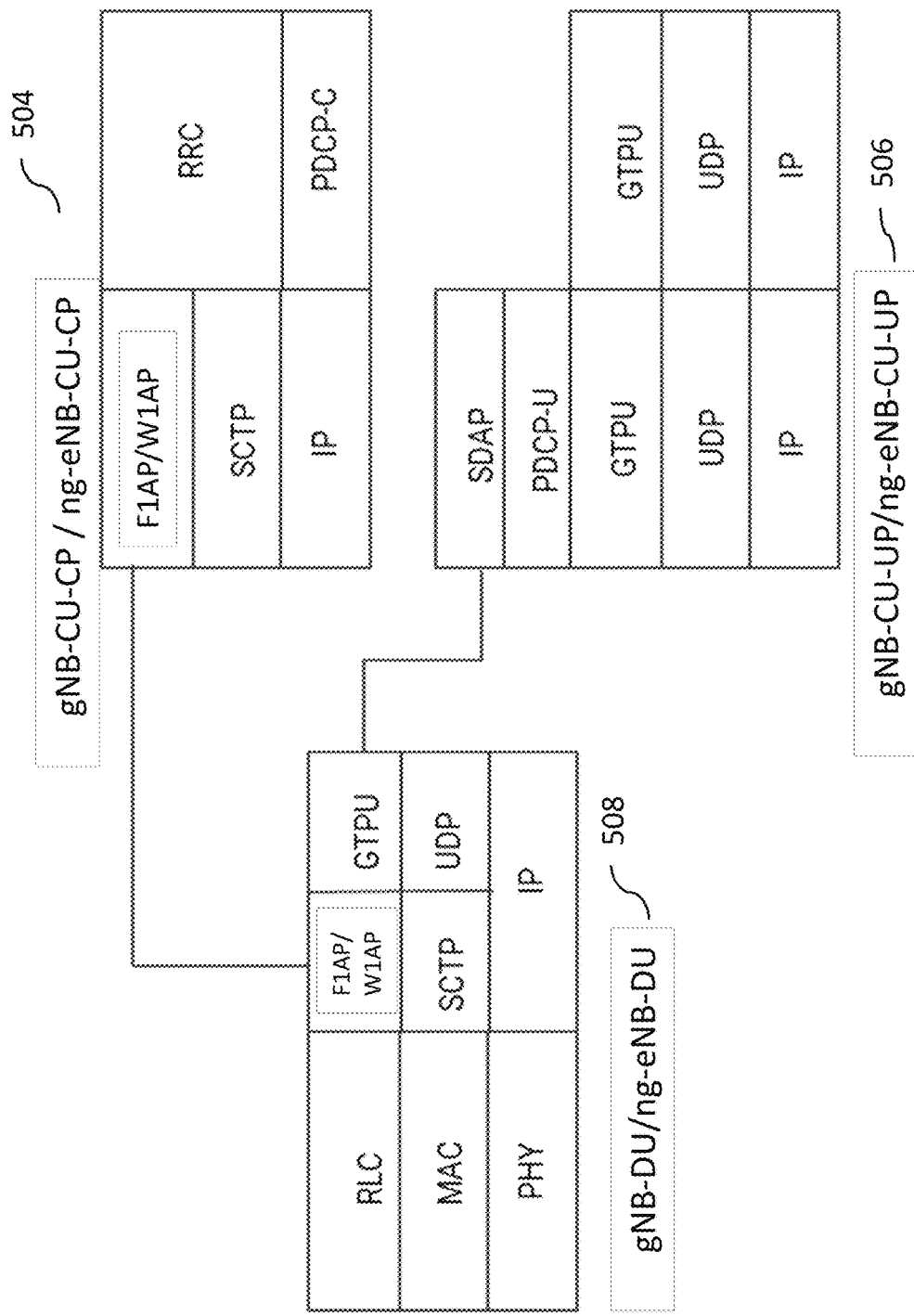
FIG. 5b illustrates an exemplary layer architecture of the split gNB and/or a split ng-eNB (e.g., next generation eNB that may be connected to 5GC)

FIG. 5*b* illustrates an exemplary layer architecture 530 of the split gNB. The architecture 530 can be implemented in the communications system 500 shown in FIG. 5*a*, which can be configured as a virtualized disaggregated radio access network (RAN) architecture, whereby layers L1, L2, L3 and radio processing can be virtualized and disaggregated in the centralized unit(s), distributed unit(s) and radio unit(s). As shown in FIG. 5*b*, the gNB-DU 508 can be communicatively coupled to the gNB-CU-CP control plane portion 504 (also shown in FIG. 5*a*) and gNB-CU-UP user plane portion 506. Each of components 504, 506, 508 can be configured to include one or more layers.

The gNB-DU 508 can include RLC, MAC, and PHY layers as well as various communications sublayers. These can include an F1 application protocol (F1-AP) sublayer, a GPRS tunneling protocol (GTPU) sublayer, a stream control transmission protocol (SCTP) sublayer, a user datagram protocol (UDP) sublayer and an internet protocol (IP) sublayer. As stated above, the distributed unit 508 may be communicatively coupled to the control plane portion 504 of the centralized unit, which may also include F1-AP, SCTP, and IP sublayers as well as radio resource control, and PDCP-control (PDCP-C) sublayers. Moreover, the distributed unit 508 may also be communicatively coupled to the user plane portion 506 of the centralized unit of the gNB. The user plane portion 506 may include service data adaptation protocol (SDAP), PDCP-user (PDCP-U), GTPU, UDP and IP sublayers.

Figure 5C:
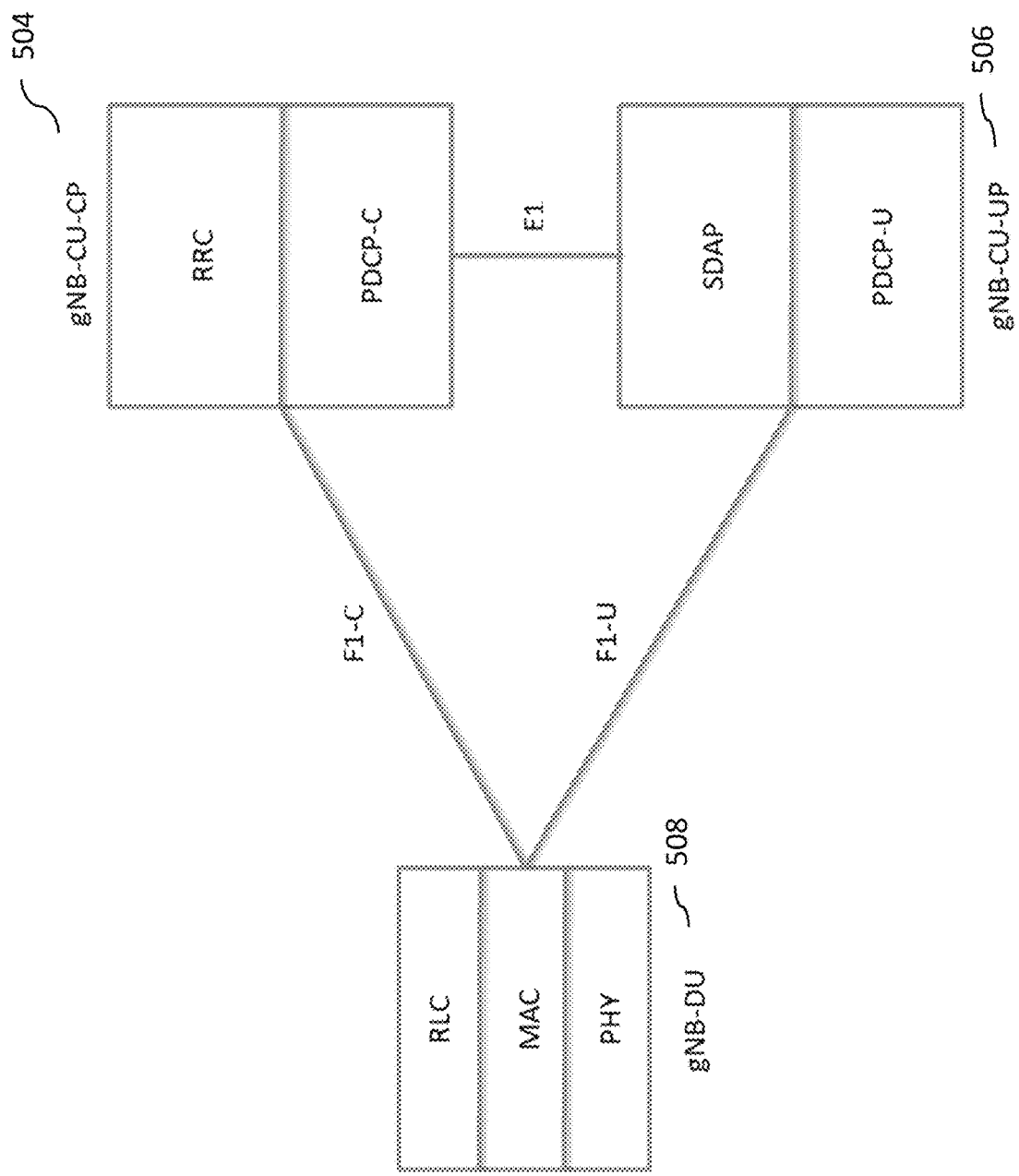
FIG. 5c illustrates an exemplary functional split in the gNB architecture shown in FIGS. 5a-b.

FIG. 5*c* illustrates an exemplary functional split in the gNB architecture shown in FIGS. 5*a*-*b*. As shown in FIG. 5*c*, the gNB-DU 508 may be communicatively coupled to the gNB-CU-CP 504 and GNB-CU-UP 506 using an F1-C communication interface. The gNB-CU-CP 504 and GNB-CU-UP 506 may be communicatively coupled using an E1 communication interface. The higher part of the PHY layer (or Layer 1) may be executed by the gNB-DU 508, whereas the lower parts of the PHY layer may be executed by the RUs (not shown in FIG. 5*c*). As shown in FIG. 5*c*, the RRC and PDCP-C portions may be executed by the control plane portion 504, and the SDAP and PDCP-U portions may be executed by the user plane portion 506.

Some of the functions of the PHY layer in 5G communications network can include error detection on the transport channel and indication to higher layers, FEC encoding/decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, RF processing, as well as other functions.

The MAC sublayer of Layer 2 can perform beam management, random access procedure, mapping between logical channels and transport channels, concatenation of multiple MAC service data units (SDUs) belonging to one logical channel into transport block (TB), multiplexing/demultiplexing of SDUs belonging to logical channels into/from TBs delivered to/from the physical layer on transport channels, scheduling information reporting, error correction through HARQ, priority handling between logical channels of one UE, priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

III. Carrier Configuration and Distributed Unit Monitoring

In some implementations, the current subject matter relates to performing a carrier configuration in a radio access network compliant radio unit (RU), where one or more distributed units (DU) may be associated with different carriers and/or different network operators. Further, the current subject matter may be configured to execute monitoring of each such DU and/or any its management connections, whereby the remote radio unit may be configured to determine individual carrier states when there is a specific DU failure.

Existing wireless communication systems (and in particular their management plane components) do not allow carriers associated with a radio unit to be configured and/or owned separately by two or more distributed units. Such systems further do not support individual determinations of carrier radio frequency (RF) state(s) based on a supervision monitoring of each radio unit. In particular, existing system configured carriers in a remote unit from a single distributed unit and determine carrier RF state(s) based on supervision monitoring of the remote unit controller sessions that directly control the entire remote unit (which is different from performing monitoring on a per carrier basis).

Moreover, existing wireless communication systems do not support one radio unit being shared by multiple distributed units, where each distribute unit may be associated and/or belong to different public land mobile network (PLMN) operator. However, radio unit sharing across different PLMN operators may be needed for the purposes of radio access network (RAN) sharing, spectrum sharing and/or network slicing processes.

Conventional radio units are provided with a carrier configuration from the radio unit controller (e.g., which can be a distributed unit and/or service management and orchestration (SMO) function) via a network configuration (NETCONF) management protocol. Typically, an entity generating a carrier configuration in the radio unit is a distributed unit that is acting as a NETCONF client. Moreover, existing radio units monitor the NETCONF connectivity towards the NETCONF clients (e.g., distributed unit(s), SMOs, etc.) using a supervision timer. In the event, the supervision timer fails, the radio unit performs one of the following processing scenarios. In a first scenario, after entering supervision failure handling mode, the radio unit is still having at least one running and valid NETCONF session with a NETCONF client that has subscribed to receive a supervision notification. The radio unit also remains operational and performs periodical call home procedure(s) toward known radio unit controllers. In another scenario, after entering supervision failure handling, the radio unit does not have a running NETCONF session with any NETCONF client that has subscribed to receive a supervision notification and thus, the radio unit ceases all radio transmission and performs autonomous reset. In either of the scenarios, when one (first scenario) or all (second scenario) supervision timers fail, the existing communications systems do not provide for any structure or operational framework for what processes the distributed unit needs to execute next for continuous operation of such systems.

In some implementations, to address the above issues, the current subject matter may execute one or more configuration processes for configuring one or more radio units for communicating with one or more distributed units, where some carriers are associated with one distributed unit while other carriers may be associated with another distributed unit. Moreover, the current subject matter may be configured to execute enforcement of access control in the radio unit such that one distributed unit may execute configuration and control of only the carrier it is associated with. Further, the radio unit may be configured to execute one or more procedures to ensure continuity of communication when a supervision timer associated with one of the distributed unit fails.

Figure 6:
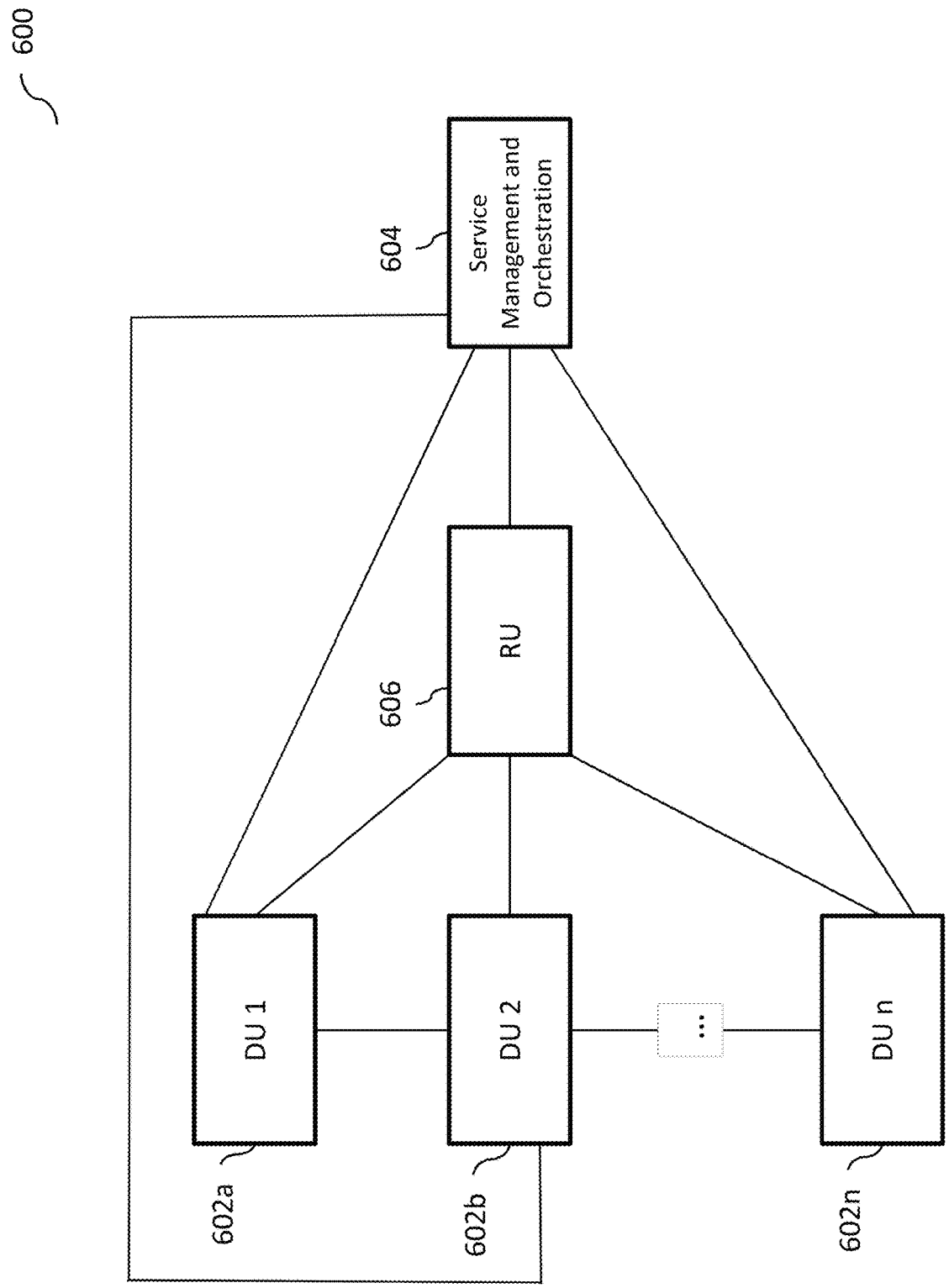
FIG. 6 illustrates an exemplary system that performs carrier access configuration and monitoring in a wireless communication system, according to some implementations of the current subject matter.

FIG. 6 illustrates an exemplary system 600 that performs carrier access configuration and monitoring in a wireless communication system, according to some implementations of the current subject matter. The system 600 may be a radio access network operating in a wireless communication environment (e.g., 4G, LTE, 5G, etc.). The system 600 may include one or more distributed units (DU1, DU2, . . . DUn) 602 (a, b, . . . n), a service management and orchestration (SMO) component 604, and a radio unit (RU) 606.

The DUs 602 may be communicatively coupled to the SMO component 604 and to the RU 606. The SMO component 604 may be communicatively coupled to the DUS 602 and the RU 606. Two or more DUs 602 may also be communicatively coupled to one another, where one of the DUs 602 (e.g., DU 602a) may be implemented and/or serve as a host and/or a primary distributed unit while one or more other DUs 602 (e.g., DUs 602b, . . . 602n) may be implemented and/or serve as tenant and/or secondary and/or shared resource operator distributed units. For the purposes of carrier access control configuration in the RU 606 (e.g., which carrier in the RU 606 is managed by which NETCONF client (i.e., DU 602), in some exemplary implementations, one or more DUs 602 may be grouped into one or more groups, e.g., host DUs, tenant DUs, user-specific DUs, etc. Once the distributed units are grouped, the carrier access control configuration procedure may be executed.

Figure 7:
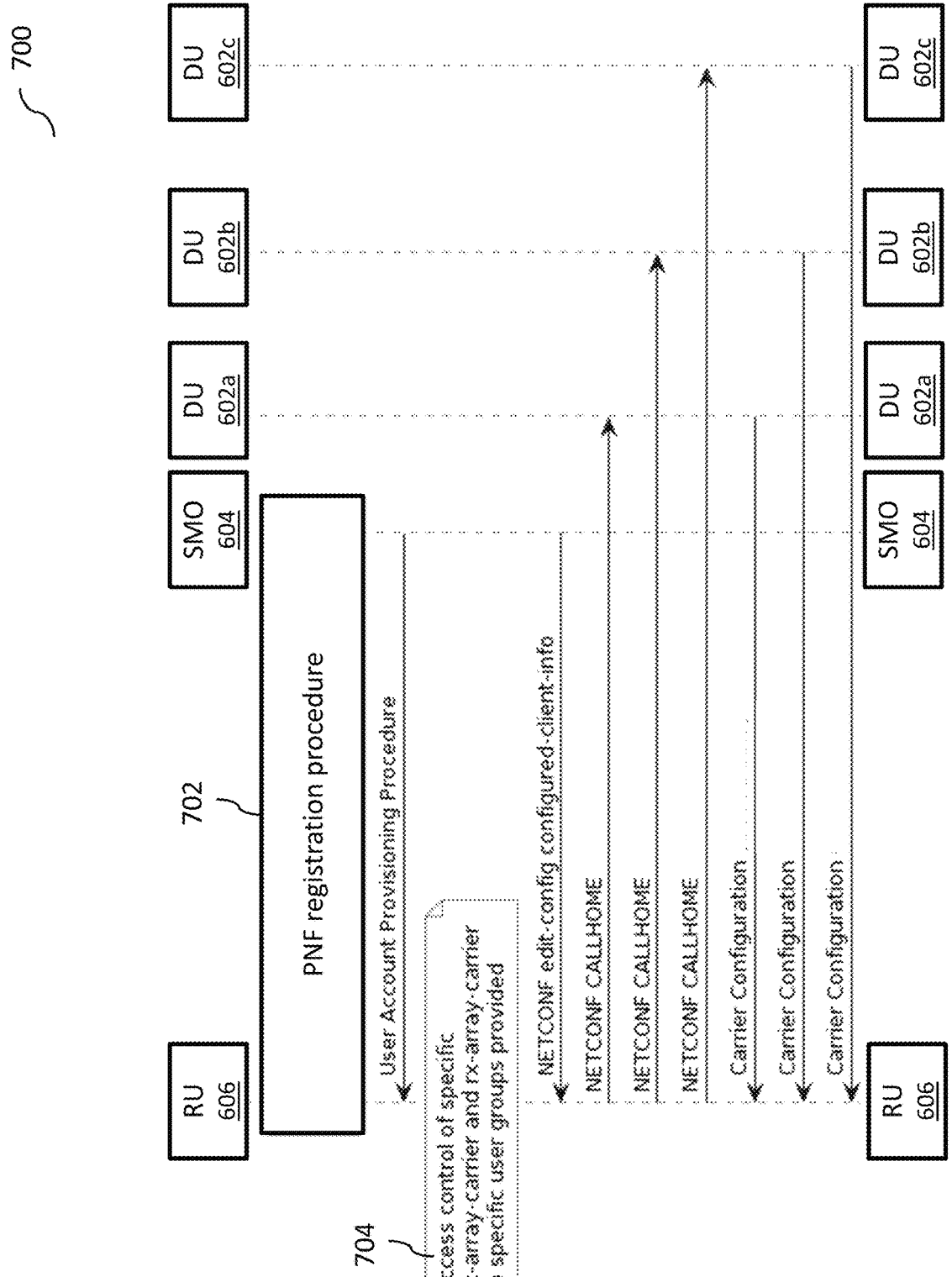
FIG. 7 illustrates an exemplary process for executing carrier access control configuration procedure, according to some implementations of the current subject matter.

FIG. 7 illustrates an exemplary process 700 for executing carrier access control configuration procedure, according to some implementations of the current subject matter. The process 700 may be executed using system 600 shown in FIG. 6. In particular, the process 700 may be executed by the RU 606, SMO component 604, and a host DU 602a as well as two tenant DUs 602b and 602c.

At 702, a physical network function (PNF) procedure may be executed by the RU 606 and the SMO component 604. In particular, the SMO component 604 may execute configuration of the RU 606 with access management (e.g., using ietf-netconf-acm.yang) capabilities, thereby providing a configuration mapping. One or more NETCONF access control model (NACM) containers may be used for the purposes of generating a configuration mapping. The NACM containers may be used for configuration of the host DU 602a as well as tenant DUs 602b, 602c, etc.

For configuration of the host DU 602a, one or more NACM containers may include an indication of one or more rule lists. The rule lists may specify that the DU 602a is a host DU. Further, the rules may specify write access paths (at 704) to one or more data nodes (e.g., using Xpath data model) that may refer to one or more transmitting array carriers (e.g., tx-array-carrier) and/or receiving array carriers (e.g., rx-array-carrier) of carriers that are controlled by host DU 602a.

Similarly, for configuration of each tenant DU 602b, 602c, etc., one or more NACM containers may include an indication of one or more rule lists that may specify that the a particular DU 602b, 602c, etc. is a tenant DU (e.g., each tenant DU may be associated with a particular container and own set of rules). Likewise, the rules may specify write access paths (at 704) to one or more data nodes (e.g., using Xpath data model) that may refer to one or more transmitting array carriers (e.g., tx-array-carrier) and/or receiving array carriers (e.g., rx-array-carrier) of carriers that are controlled by respective tenant DUs 602b, 602c, etc.

The SMO component 704 may also transmit a "NETCONF edit-config client info" message for configuring the RU 606 using configured client (e.g., DUs 602) information. The information may include various details, such as, for example, management plane internet protocol (IP) address and/or fully qualified domain name (FQDN) of each of DU 602 that the RU 606 needs to connect to.

Once the RU 606 receives this information, it may transmit a NETCONF CALLHOME message to each of the DUs 602a, 602b, and 602c (and/or any other DUs 602 that may have been configured). In response, each DU 602 (a, b, c) may configure its respective transmitting and receiving array carrier and transmit carrier configuration messages to the RU 606.

Figure 8:
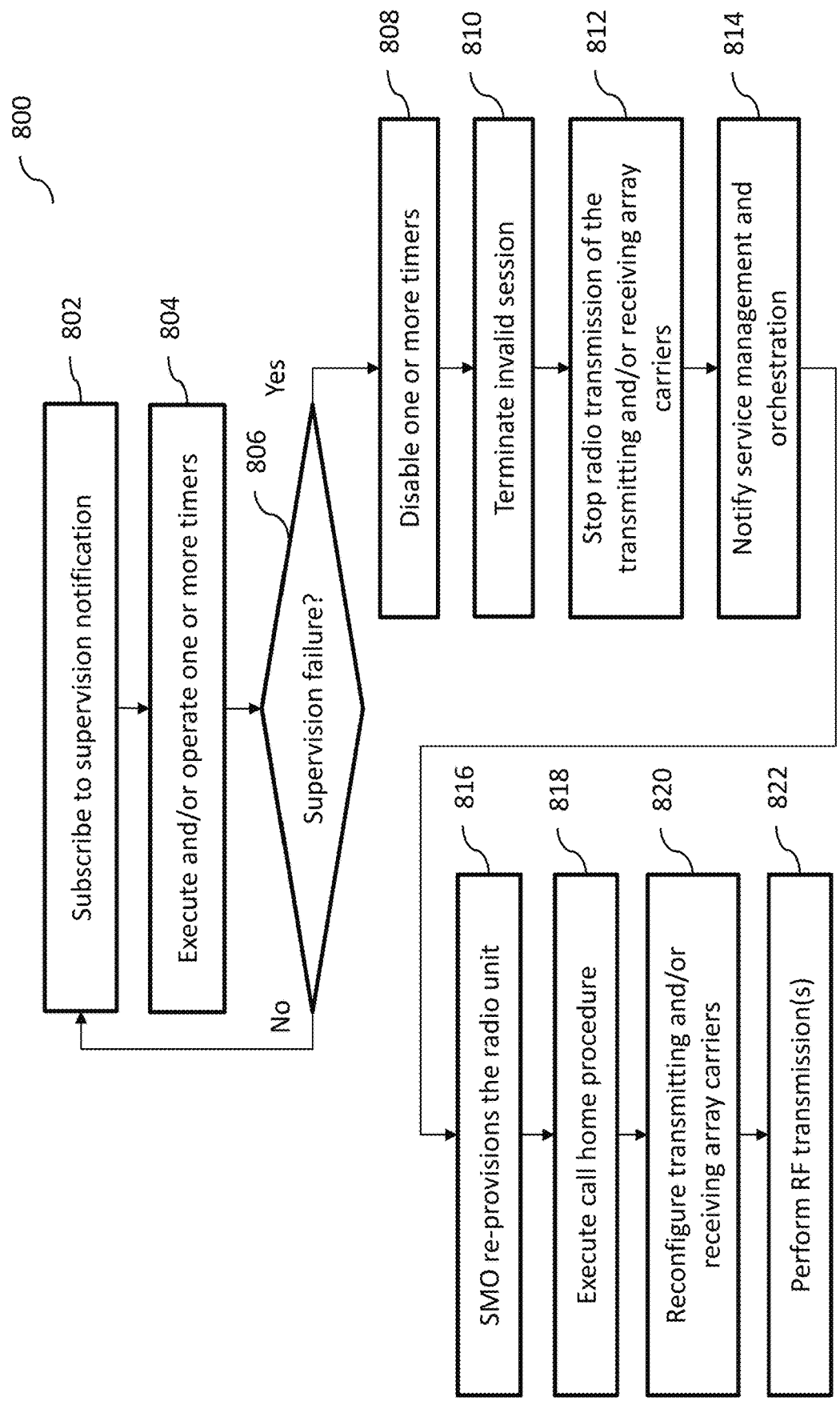
FIG. 8 illustrates an exemplary process for executing monitoring of supervision failure, according to some implementations of the current subject matter.

Once the carriers are configured in the RU 606 by each of the DU 602, each of DU 602 may enable the NETCONF connectivity monitoring procedure. FIG. 8 illustrates an exemplary process 800 for executing monitoring of supervision failure, according to some implementations of the current subject matter. The process 800 may be executed by the system 600 shown in FIG. 6 and may be performed subsequent to the configuration procedures shown in FIG. 7 and discussed above.

At 802, to enable the monitoring procedure, each DU 602 may subscribe for supervision notification. Once the supervision notification is subscribed, the RU 606 may execute and/or operate one or more timers (e.g., a notification timer, a supervision timer, etc.) with respect to each of the DUs 602, at 804.

The timers may be used for the purposes of supporting bi-directional monitoring of NETCONF connectivity. The notification timer may have a value that may be equal to a supervision notification time interval (e.g., with default value of 60 seconds). To use the notification timer, the RU 606 may send one or more supervision notifications to those NETCONF clients (e.g., DUs 602) that have subscribed to receive such notifications. The RU 606 may send such supervision notifications when the notification time interval expires. A controller (e.g., a processor) component of the RU 606 may confirm that NETCONF connectivity to the RU 606 is operational by receiving the supervision notification.

The supervision timer may have a value that may be equal to a combined time interval of a supervision notification time interval (e.g., with a default value of 60 seconds) plus a guard timer overhead time interval (e.g., with a default value of 10 seconds). In this case, the RU 606 may identify one or more supervision failure operations when the combined time interval expires. To avoid supervision timer expiration, a NETCONF client (e.g., DUs 602) that has subscribed to receive the supervision notification(s) may repeatedly reset the supervision timer. Such supervision timer reset may be considered by the RU 606 as a confirmation that the NETCONF connectivity to the controller component of the RU 606 may be operational.

In some implementations, the current subject matter may be configured to enhance supervision failure handling and supervision termination handling processes. For example, such enhanced processes may be implemented when sharing of RU 606 by multiple DUs 602 is not supported by the RU 606 and/or a failure of a NETCONF session occurs towards a NETCONF client (e.g., DUs 602) group other than host DU 602a and/or any tenant DUs 602b, 602c.

When supervision failure is detected by the RU 606, at 806, the RU 606 may immediately disable operation of one or more of the above timers, at 808, for the corresponding NETCONF session. The RU 606 may then assume NETCONF session related to the failed supervision is no longer valid. The RU 606 may terminate, at 810, the invalid NETCONF session by closing one or more underlying secure shell protocol (SSH) and/or transport layer security (TLS) connections. The RU 606 may also start performing a call home procedure towards the NETCONF client (e.g., DU 602), using the re-call-home-no-ssh-timer to repeat the call home attempts. The call home procedure may be repeated by the RU 606 until either a new NETCONF session is established by the original NETCONF client (e.g., DU 602) and/or the original NETCONF client (e.g., DU 602) no longer corresponds to a known controller of the RU 606. This may occur when re-performing dynamic host configuration protocol (DHCP) configuration, where the identity of the controller of the RU 606 corresponding to the NETCONF client (e.g., DU 602) is no longer signaled by the DHCP server, and/or the NETCONF client (e.g., DU 602) was previously configured using the configured-client-info container and this configuration has been deleted.

Moreover, after entering supervision failure handling, the RU 606 may still have at least one running and/or valid NETCONF session with a NETCONF client (e.g., DU 602) that may have subscribed to receive the supervision notification. Here, the RU 606 may remain operational and may perform periodical call home towards known controllers of the RU 606. Alternatively, or in addition to, after entering supervision failure handling, the RU 606 might not have a running NETCONF session with any NETCONF client (e.g., DU 602) that may have subscribed to receive the supervision notification. In this case, the RU 606 may cease all radio transmission and may perform an autonomous reset.

In some implementations, when sharing of the RU 606 by multiple DUs 602 is supported by the RU 606 and the failed NETCONF session is associated with a host DU 602a and/or tenant DUs 602b, 602c, etc., after entering supervision failure handling, the RU 606 may stop, at 812, radio transmission(s) of the transmitting and/or receiving array carriers (e.g., tx-array-carrier, rx-array-carrier) that may be controlled by the failed DU 602 (e.g., host DU 602a, tenant DUs 602b, 602c).

At 814, the RU 606 may then then notify the SMO component 604 of the failed NETCONF session. For example, the notification may be transmitted using an alarm and/or any other trigger, alert, etc. that may include one or more fault identifiers (e.g., fault-id).

At 816, the SMO component 604 may re-provision the RU 606 using the DU 602's information contained in the configured client (e.g., DU 602) information. The RU 606, after receiving reconfigured configured client information may execute a NETCONF callhome procedure by transmitting NETCONF callhome message to DU 602, at 818. The DU 602 may then reconfigure the transmitting and/or receiving array carriers (e.g., tx-array-carrier and rx-array-carrier) that it may control using the information in the received message, at 820. The RU 606 may then start the RF transmission of that carrier, at 822.

Figure 9:
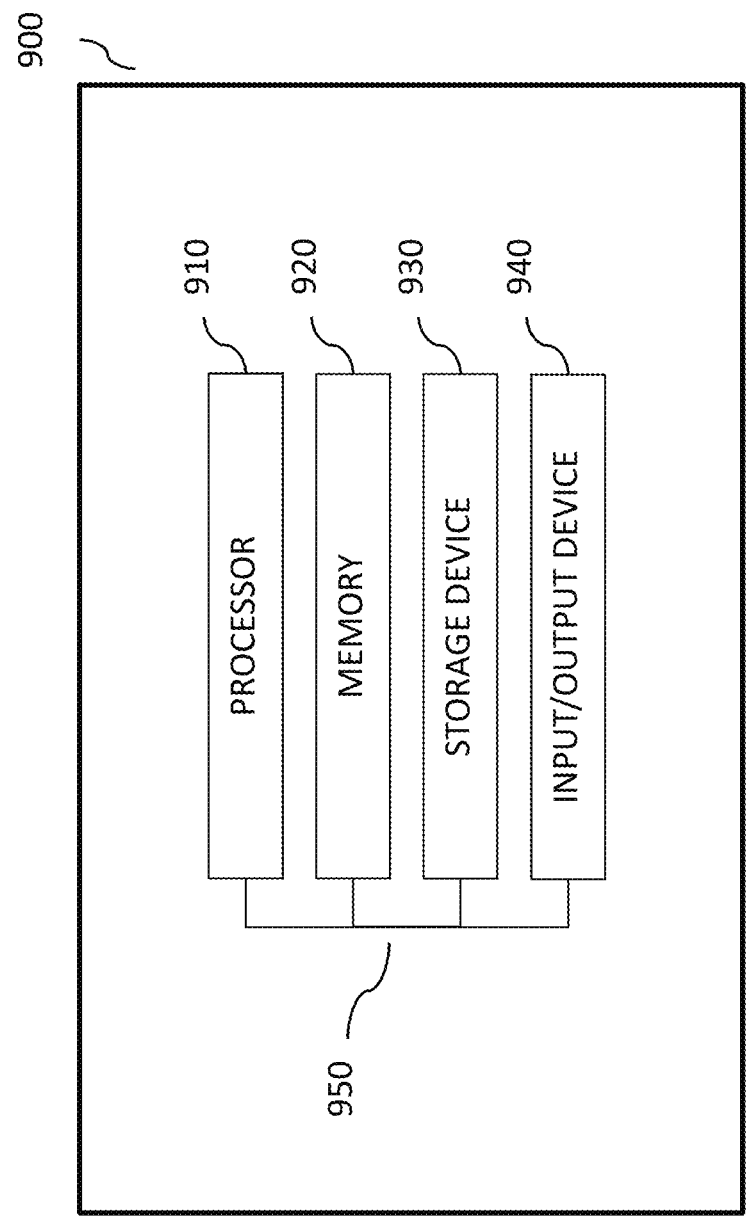
FIG. 9 illustrates an exemplary system, according to some implementations of the current subject matter.

In some implementations, the current subject matter can be configured to be implemented in a system 900, as shown in FIG. 9. The system 900 can include one or more of a processor 910, a memory 920, a storage device 930, and an input/output device 940. Each of the components 910, 920, 930 and 940 can be interconnected using a system bus 950. The processor 910 can be configured to process instructions for execution within the system 600. In some implementations, the processor 910 can be a single-threaded processor. In alternate implementations, the processor 910 can be a multi-threaded processor. The processor 910 can be further configured to process instructions stored in the memory 920 or on the storage device 930, including receiving or sending information through the input/output device 940. The memory 920 can store information within the system 900. In some implementations, the memory 920 can be a computer-readable medium. In alternate implementations, the memory 920 can be a volatile memory unit. In yet some implementations, the memory 920 can be a non-volatile memory unit. The storage device 930 can be capable of providing mass storage for the system 900. In some implementations, the storage device 930 can be a computer-readable medium. In alternate implementations, the storage device 930 can be a floppy disk device, a hard disk device, an optical disk device, a tape device, non-volatile solid state memory, or any other type of storage device. The input/output device 940 can be configured to provide input/output operations for the system 900. In some implementations, the input/output device 940 can include a keyboard and/or pointing device.

In alternate implementations, the input/output device 940 can include a display unit for displaying graphical user interfaces.

Figure 10:
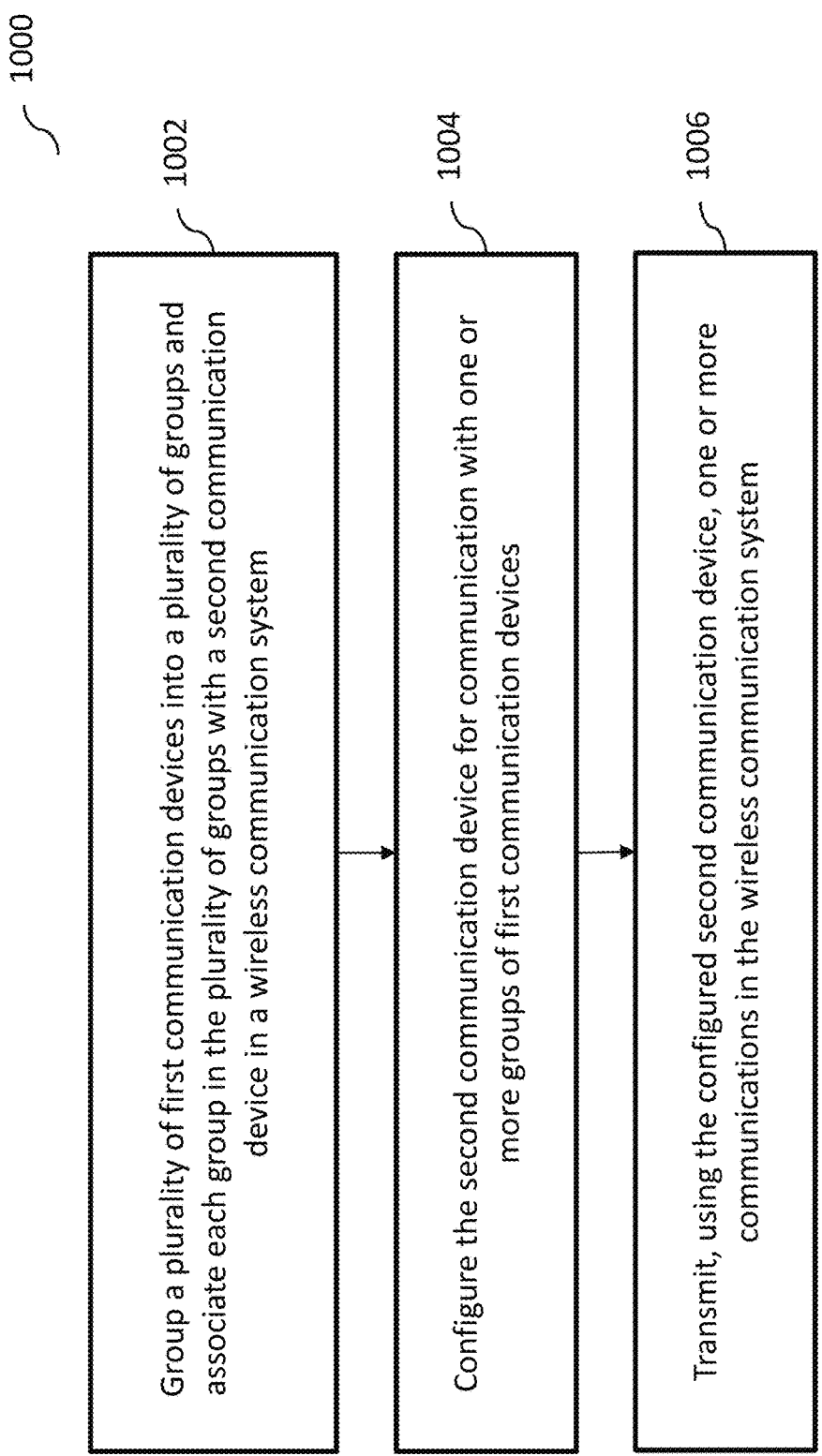
FIG. 10 illustrates an exemplary method, according to some implementations of the current subject matter.

FIG. 10 illustrates an exemplary method 1000 for configuring and/or monitoring of one or more communication devices (e.g., radio units, distributed units) in a wireless communication system, according to some implementations of the current subject matter. The method 1000 may be executed using one or more components of the systems shown in FIGS. 6-7 executing one or more functionalities illustrated in FIG. 8.

At 1002, a plurality of first communication devices (e.g., DUs 602 as shown in FIG. 6) may be grouped into a plurality of groups (e.g., host DU 602*a*, tenant DUs 602*b* . . . 602*n*, etc.). Each group in the plurality of groups may be associated with a second communication device (e.g., RU 606 as shown in FIG. 6) in a wireless communication system. At 1004, the second communication device (e.g., RU 606) may be configured (as discussed above with regard to FIG. 7) for communication with one or more groups of first communication devices (e.g., host DU 602*a*, tenant DUs 602*b* . . . 602*n*, etc.). At 1006, one or more communications may be transmitted using the configured second communication device in the wireless communication system.

In some implementations, the current subject matter can include one or more of the following optional features. Each first communication device in the plurality of first communication devices may be a distributed unit. The second communication device may be a radio unit.

In some implementations, one or more first communication devices in the plurality of first communication devices may include a host first communication device and another one or more first communication devices in the plurality of first communication devices is a shared resource operator first communication device. Each host first communication device in the one or more first communication devices may be grouped into one or more host groups in the plurality of groups. Each shared resource operator first communication device in the another one or more first communication devices may be grouped into one or more shared resource operator groups in the plurality of groups.

In some implementations, the method 1000 may further include detecting failure of the host first communication device, and terminating communication with the failed host first communication device. The communication may be associated with a predetermined carrier controlled by the failed host first communication device. In some implementations, the configuring of the second communication device may include reconfiguring, based on the detection of the failure of the host first communication device, for communication with another one or more groups of first communication devices. The reconfiguring may be executed using service management and orchestration function of the wireless communication system. Further, reconfiguring may be executed in a management plane.

In some implementations, the method 1000 may also include transmitting a call home command to the another one or more groups of first communication devices, and receiving, in response to the call home command, one or more carrier configurations from another one or more groups of first communication devices. The carrier configurations may be configured by another one or more groups of first communication devices. One or more carrier configurations may include at least one of: one or more transmitting array carrier configurations and one or more receiving array carrier configurations. Transmission of one or more communications in the wireless communication system may include transmitting one or more communications using one or more carrier configurations.

In some implementations, at least one of the grouping, the configuring, and the transmitting may be performed by at least one base station in a wireless communication system. The base station may include at least one of the following: a base station, an eNodeB base station, a gNodeB base station, a wireless base station, and any combination thereof. The base station may be a base station operating in at least one of the following communications systems: a long term evolution communications system, a new radio communications system, a wireless communication system, and any combination thereof.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback: and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
    grouping a plurality of first communication devices into a plurality of groups and associating each group in the plurality of groups with a second communication device in a wireless communication system;
    configuring the second communication device for communication with one or more groups of first communication devices; and
    transmitting, using the configured second communication device, one or more communications in the wireless communication system,
    wherein the second communication device is configured for communication by receiving, from a first communication device among the plurality of first communication devices, a carrier configuration configured by the first communication device and receiving, from another first communication device among the plurality of first communication devices, another carrier configuration configured by the another first communication device,
    wherein one or more first communication devices in the plurality of first communication devices is a host first communication device and another one or more first communication devices in the plurality of first communication devices is a shared resource operator first communication device,
    wherein each host first communication device in the one or more first communication devices is grouped into one or more host groups in the plurality of groups, each shared resource operator first communication device in the another one or more first communication devices is grouped into one or more shared resource operator groups in the plurality of groups,
    wherein the method further comprises:
        detecting failure of the host first communication device; and
        terminating communication with the failed host first communication device, where the communication is associated with a predetermined carrier controlled by the failed host first communication device,
    wherein the configuring of the second communication device includes reconfiguring, based on the detection of the failure of the host first communication device, for communication with another one or more groups of first communication devices, and
    wherein the method further comprises:
        transmitting a call home command to the another one or more groups of first communication devices; and
        receiving, in response to the call home command, one or more carrier configurations from the another one or more groups of first communication devices, the one or more carrier configurations being configured by the another one or more groups of first communication devices.

2. The method according to claim 1, wherein each first communication device in the plurality of first communication devices is a distributed unit.

3. The method according to claim 2, wherein the second communication device is a radio unit.

4. The method according to claim 1, wherein the reconfiguring is executed using service management and orchestration function of the wireless communication system.

5. The method according to claim 1, wherein the reconfiguring is executed in a management plane.

6. The method according to claim 1, wherein the one or more carrier configurations includes at least one of: one or more transmitting array carrier configurations and one or more receiving array carrier configurations.

7. The method according to claim 1, wherein the transmitting the one or more communications in the wireless communication system includes transmitting the one or more communications using the one or more carrier configurations.

8. The method according to claim 1, wherein at least one of the grouping, the configuring, and the transmitting is performed by at least one base station in a wireless communication system.

9. The method according to claim 8, where the base station includes at least one of the following: a base station, an eNodeB base station, a gNodeB base station, a wireless base station, and any combination thereof.

10. The method according to claim 9, wherein the base station is a base station operating in at least one of the following communications systems: a long term evolution communications system, a new radio communications system, a wireless communication system, and any combination thereof.

11. The method according to claim 1, wherein the first communication device is of a first mobile network operator, and the another first communication device is of a second mobile network operator different from the first mobile network operator.

12. An apparatus, comprising:
at least one processor, and
at least one non-transitory storage media storing instructions that, when executed by the at least one processor, cause the at least one processor to perform operations comprising:
grouping a plurality of first communication devices into a plurality of groups and associating each group in the plurality of groups with a second communication device in a wireless communication system;
configuring the second communication device for communication with one or more groups of first communication devices; and
transmitting, using the configured second communication device, one or more communications in the wireless communication system,
wherein the second communication device is configured for communication by receiving, from a first communication device among the plurality of first communication devices, a carrier configuration configured by the first communication device and receiving, from another first communication device among the plurality of first communication devices, another carrier configuration configured by the another first communication device,
wherein one or more first communication devices in the plurality of first communication devices is a host first communication device and another one or more first communication devices in the plurality of first communication devices is a shared resource operator first communication device,
wherein each host first communication device in the one or more first communication devices is grouped into one or more host groups in the plurality of groups, each shared resource operator first communication device in the another one or more first communication devices is grouped into one or more shared resource operator groups in the plurality of groups,
wherein the operations further comprise:
detecting failure of the host first communication device; and
terminating communication with the failed host first communication device, where the communication is associated with a predetermined carrier controlled by the failed host first communication device,
wherein the configuring of the second communication device includes reconfiguring, based on the detection of the failure of the host first communication device, for communication with another one or more groups of first communication devices, and
wherein the operations further comprise:
transmitting a call home command to the another one or more groups of first communication devices; and
receiving, in response to the call home command, one or more carrier configurations from the another one or more groups of first communication devices, the one or more carrier configurations being configured by the another one or more groups of first communication devices.

13. At least one non-transitory storage media storing instructions that, when executed by at least one processor, cause the at least one processor to perform operations comprising:
grouping a plurality of first communication devices into a plurality of groups and associating each group in the plurality of groups with a second communication device in a wireless communication system;
configuring the second communication device for communication with one or more groups of first communication devices; and
transmitting, using the configured second communication device, one or more communications in the wireless communication system,
wherein the second communication device is configured for communication by receiving, from a first communication device among the plurality of first communication devices, a carrier configuration configured by the first communication device and receiving, from another first communication device among the plurality of first communication devices, another carrier configuration configured by the another first communication device,
wherein one or more first communication devices in the plurality of first communication devices is a host first communication device and another one or more first communication devices in the plurality of first communication devices is a shared resource operator first communication device,
wherein each host first communication device in the one or more first communication devices is grouped into one or more host groups in the plurality of groups, each shared resource operator first communication device in the another one or more first communication devices is grouped into one or more shared resource operator groups in the plurality of groups,
wherein the operations further comprise:
detecting failure of the host first communication device; and
terminating communication with the failed host first communication device, where the communication is associated with a predetermined carrier controlled by the failed host first communication device, wherein the configuring of the second communication device includes reconfiguring, based on the detection of the failure of the host first communication device, for communication with another one or more groups of first communication devices, and wherein the operations further comprise:
  transmitting a call home command to the another one or more groups of first communication devices; and
  receiving, in response to the call home command, one or more carrier configurations from the another one or more groups of first communication devices, the one or more carrier configurations being configured by the another one or more groups of first communication devices.

\* \* \* \* \*